Patented Nov. 12, 1929

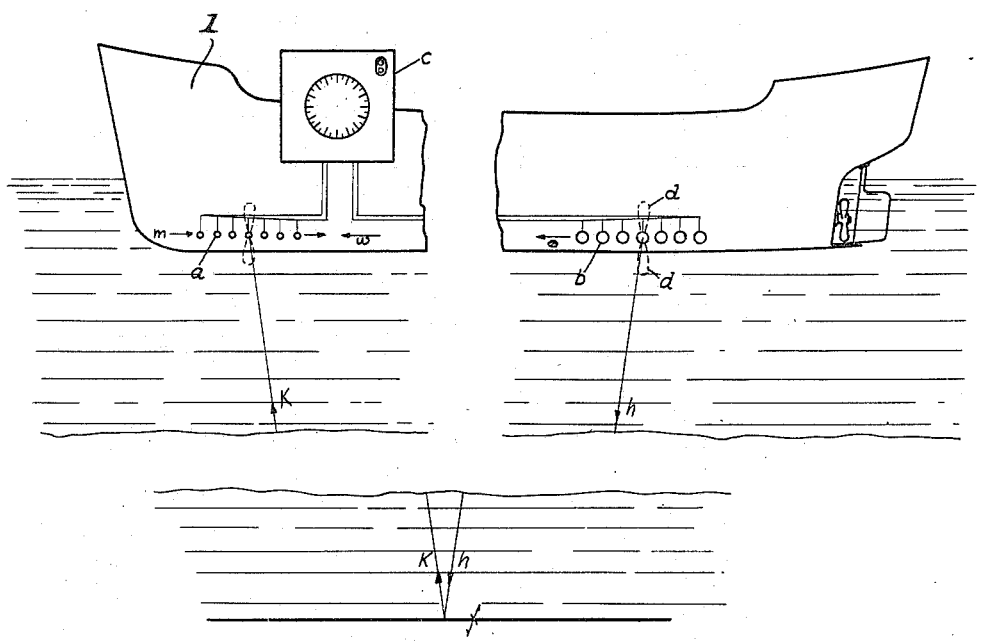

1,735,460

UNITED STATES PATENT OFFICE

WALTER HAHNEMANN, OF KITZEBERG, NEAR KIEL, AND HEINRICH HECHT AND BERNHARD NIELSEN, OF KIEL, GERMANY, ASSIGNORS TO SIGNAL GESELLSCHAFT M. B. H., OF BREMEN, GERMANY

METHOD AND ARRANGEMENT OF DIRECTIONAL WAVE RECEPTION AND EMISSION

Application filed December 27, 1927, Serial No. 242,850, and in Germany October 5, 1927.

The present application deals with the arrangement of receiving and sending means upon a vessel for the express purpose of determining depths of water.

The copending United States application No. 58,943 of September 26, 1925, deals generally with the arrangement of receiving and sending apparatus for the most efficient directive sound reception and emission. It is pointed out in that specification that the best arrangement is obtained when the individual elements are spaced apart a distance of $\frac{n-1}{n}$ times the wave length of the sound to be emitted. It is also pointed out that the directive effect becomes intensified the greater the number of units employed in the system.

The present invention deals with the application of the above principle for depth sounding. In the previously mentioned specification, the arrangement of the units is generally specified as being in a vertical line, in which case the maximum directive effect is in a horizontal plane perpendicular to the vertical line. A plurality of senders arranged in a vertical line $\frac{n-1}{n}$ times the wave length apart will radiate most intensely in a horizontal plane, while receivers similarly arranged will receive best sounds approaching the line of receivers horizontally.

In the art of depth sounding by measuring the time interval between the emission of a sound upon a boat and the receipt of the echo, it often happens, particularly in shallow water, that the sending apparatus continues to vibrate when the echo is returning because the interval of time between the emission of the sound and the receipt of the echo is extremely short or because the sound emitter itself does not die down quickly enough to be quiet before the echo returns. This difficulty has a tendency to prevent accurate measurements of shallow depths, which are of utmost importance in shallow water navigation. In addition to the above difficulty just discussed, soundings by the echo method are also made difficult while the vessel is under way and even at rest, at times, by extraneous noises which affect the receiving apparatus. These noises may be classified as water noise due to the motion of the boat through the water, water noise due to the splashing and striking of the waves against the boat, ship's noise due to the internal machinery and propeller noise due to the rotation of the propeller.

An analysis of these noises shows that the sources of practically all of them originate either in the bow or stern of the vessel. The propeller and running machinery, causing practically all the ship's noise, is mostly in the stern of the vessel, the noise due to the motion of the vessel comes for the most part from the bow, from which also originates most of the noise due to the splashing and striking of the waves.

In the present arrangement of apparatus, the receiving member is not only so placed as to be free from the effect of the sound produced and transmitted directly to the receiving system, but also free from the effect of the noises of the types above described.

In the figure, 1 indicates a vessel on the side of which the receivers are mounted as indicated at "$a$" in the drawing in a horizontal line extending forward and aft of the vessel. Towards the stern the senders "$b$" are similarly arranged. Both senders and receivers are connected with the depth sounding apparatus "$c$" which measures the time interval between the signal sent from the transmitters "$b$" and the receipt of the returning echo at the receivers "$a$".

The transmitters "$b$" are so arranged as to have a combined directive transmission effect, as indicated by the lobes "$d$". In other words, most of the energy of the transmitters is radiated in directions perpendicular to the line of transmitters, very little being radiated in directions other than just indicated. As a result, practically no sound travels in the direction of the arrow $e$ from the senders to the receivers and therefore the direct sound is hardly heard at all. The receivers are in a zone of silence of the senders. Likewise, the fact that the receivers are so arranged that they will practically receive sound coming only from directions perpendicular to the line of receivers cuts down still further the intensity of the directly transmitted signal in the receivers. While individually the receivers are somewhat affected by the sound transmitted, because of the peculiar spacing the combined effect of the direct signal is entirely eliminated.

Since, however, the sound transmitted and returning from the bottom $f$ as indicated by the arrowed lines $h$ and $k$ respectively, is in directions substantially perpendicular to the lines of transmitters and receivers respectively, the sound will be transmitted and received most efficiently. Regardless of the depth, therefore, sounding can be made, since the direct signal is practically eliminated from consideration as a factor affecting the receiving system in preventing either shallow or deep depth measurement.

As has been pointed out above, this is not the only advantage to be gained by the present arrangement. In addition the water noise approaching in the direction of the arrows $m$ and $w$ and the ship's noises approaching mostly in the direction of the arrow $w$ will be eliminated.

Having now described our invention, we claim:

1. A system for measuring depths including a vessel, means for sending a sound wave, a group of cooperating sound receivers insensitive to sound approaching from the direction of the sending means, and means for measuring the time interval between the emission of the sound and the receipt of the reflected echo at the said receivers.

2. A system for measuring depths including a vessel, a group of sound senders for producing a sound wave, receiving means positioned in the zone of silence of said sending group, and means for measuring the time interval between the emission of the sound and the receipt of the reflected echo at the said receivers.

3. In a system for measuring depth including a vessel, a group of sound senders having silent zones in substantially horizontal directions, and receiving means substantially insensitive to sound waves approaching in horizontal directons.

4. In a system for measurng depths including a vessel, a group of sound senders having silent zones extending lengthwise of the vessel, and receiving means substantially insensitive to sound waves approaching lengthwise of the vessel.

5. In a system for measuring depth including a vessel, sound producing means having silent zones extending lengthwise of the vessel, and receiving means substantially insensitive to sound waves aproaching lengthwise of the vessel.

6. In a system for measuring depths including a vessel, a group of sound producers having silent zones extending lengthwise of the vessel, and a group of sound receivers substantially insensitive to sound waves approaching lengthwise of the vessel.

7. In a system for measuring depths including a vessel, a group of sound producers arranged lengthwise of the vessel and having a silent zone in the same direction, and a group of sound receivers also arranged lengthwise of the vessel and substantially insensitive to sound waves approaching lengthwise of the vessel.

In testimony whereof we affix our signatures.

WALTER HAHNEMANN.
HEINRICH HECHT.
BERNHARD NIELSEN.